US011415262B2

(12) United States Patent
Downs

(10) Patent No.: US 11,415,262 B2
(45) Date of Patent: Aug. 16, 2022

(54) MOUNT ADAPTER FOR MICROPHONE STAND HEADS

(71) Applicant: Eric Downs, Los Angeles, CA (US)

(72) Inventor: Eric Downs, Los Angeles, CA (US)

(*) Notice: Subject to any disclaimer, the term of this patent is extended or adjusted under 35 U.S.C. 154(b) by 203 days.

(21) Appl. No.: 16/933,776

(22) Filed: Jul. 20, 2020

(65) Prior Publication Data
US 2022/0018489 A1 Jan. 20, 2022

(51) Int. Cl.
F16M 11/04 (2006.01)
H04R 1/08 (2006.01)

(52) U.S. Cl.
CPC ............ F16M 11/041 (2013.01); H04R 1/08 (2013.01)

(58) Field of Classification Search
CPC ........ H04R 1/08; F16M 11/041; F16M 11/24; G10G 5/00
See application file for complete search history.

(56) References Cited

U.S. PATENT DOCUMENTS

| 3,893,363 | A | 7/1975 | Cohen |
| 5,154,381 | A * | 10/1992 | Malinao ................ H04R 1/08 403/299 |
| 6,316,706 | B1 | 11/2001 | Sammons |
| 7,291,775 | B2 | 11/2007 | Yu |
| 9,982,696 | B1 | 5/2018 | Hennessey et al. |
| 10,433,639 | B2 | 10/2019 | Hennessey |
| 2002/0168078 | A1* | 11/2002 | Kuerti .................... H04R 3/002 381/361 |
| 2010/0254559 | A1* | 10/2010 | Heil ..................... H04R 1/08 381/361 |
| 2014/0050344 | A1* | 2/2014 | Hilderman ............ H04R 1/026 29/525.01 |
| 2017/0191296 | A1* | 7/2017 | Eaton ..................... F16L 3/015 |

FOREIGN PATENT DOCUMENTS

CN 205082920 U 3/2016
CN 106989093 A 7/2020

OTHER PUBLICATIONS

Name: adorama.com Product: Manfrotto Rapid Adapter, Converts Standard ⅝" Lightstand Tip to a 17mm Long ⅜" Male Thread. (#3102) Website:https://www.adorama.com/bg3102.html?gclid=Cj0KCQjwpLfzBRCRARIsAHuj6qUNxfMcTgDtZoWlaXyc30y5O9zx0yRcfq6CMjREcsLle-6asxsr4OMaAuKUEALw_wcB&utm_source=adl-gbase.

* cited by examiner

Primary Examiner — Tuan D Nguyen
(74) Attorney, Agent, or Firm — Cynthia S. Lamon; Lamon Patent Services

(57) ABSTRACT

An adapter for mounting an instrument or accessory device to microphone stand head includes a conical body having an overall length with a maximum outside diameter and a minimum outside diameter, an elongate mounting post having an overall length, the mounting post contiguously formed to or otherwise fixed to the conical body, the mounting post and conical body aligned to share the same longitudinal center, the mounting post bearing external threading from the free end of the mounting post down the post to some length, and an end cap having a uniform outside diameter and an annular threaded mounting seat provided at proximal center of the threaded end cap, where the mounting seat threads mate with the external threads on the mounting post.

19 Claims, 5 Drawing Sheets

MOUNT ADAPTER FOR MICROPHONE STAND HEADS

BACKGROUND OF THE INVENTION

1. Field of the Invention

The present invention is in the field of musical equipment accessories including hardware and pertains particularly to an adapter plug apparatus for a microphone stand head.

2. Discussion of the State of the Art

In the field of live music, wide variety of musical stands are available and known in the art for mounting or seating musical instruments ranging from stands for mounting or staging drums, cymbals, and percussion accessories to stands for positioning guitars, horns, keyboards, speakers, and microphones. Boom stands are available for mounting heavy cymbals, other heavy percussion instruments or drumming and percussion equipment. These stands are typically heavy metal stands that include three legs or a heavy base, a vertical central stand adjustable for height, and a length adjustable or extendable boom bar that may be held by hardware at the top of the vertical stand.

Some components including certain percussion instruments, and some sound studio components like sound baffles or sound dampeners are ultra-light components that do not require a heavy metal stand to counterweight or to maintain a state of not tipping over. Heavy stands require more task effort to haul around and to set up. Microphone stands are sometimes provided in the form of boom stands that are on average and, depending on material, much lighter in weight than metal boom stands and much easier to haul and set up because of the light weight of material tubing and hardware used to attach the boom.

It has occurred to the inventor that a microphone stand could, with proper modification, replace a heavier metal boom-stand for specific applications involving light weight accessories. Other tasks could be made simpler by introducing an adapter that fits the microphone stand head in place of a standard microphone. Therefore, what is clearly needed is an adapter plug that can be used to secure a sound baffle or some other light-weight musician's accessory on the microphone stand.

BRIEF SUMMARY OF THE INVENTION

According to an embodiment of the present invention, an adapter is provided for mounting an instrument or accessory device to a microphone stand head. The adapter includes a conical body having an overall length, a maximum outside diameter, a minimum outside diameter, an elongate mounting post having an overall length with the mounting post contiguously formed to or otherwise fixed to the conical body, the mounting post and conical body aligned to share the same longitudinal center, the mounting post bearing external threading from the free end of the mounting post down the post to some length, an end cap having a uniform outside diameter, and an annular threaded mounting seat provided at proximal center of the threaded end cap where the mounting seat threads mate with the external threads on the mounting post.

In one embodiment, the conical body is a solid body. In another embodiment, the conical body is a thick wall hollow body. In one embodiment, the mounting post is fixed to the conical body via weld. In one embodiment, the conical body is a heavy metallic body. In a preferred embodiment, the conical body is tapered downward from the plane of the maximum outside diameter to the plane of the minimum outside diameter. In one embodiment, the perimeter surface of the end cap is gnarled or otherwise tooled to present a positive grip surface to aid in turning the end cap. In one embodiment, the mounting post seats into a center hole placed through the conical body at longitudinal center.

In a preferred embodiment, the threading on the mounting post and in the mounting post seat on the end cap is M 1.25 coarse thread. In one embodiment, the microphone stand is a boom stand, and the microphone stand head is threaded onto the end of the boom. In one implementation, the mounted instrument or accessory device is a sound baffle. In another implementation, the mounted instrument or accessory device is a recording device. In a variation of this implication, the mounted instrument or accessory device is threaded onto the mounting post. In another variation of this implementation, the recording device is threaded onto a post of a thread adapter that in turn is threaded onto the mounting post.

In one embodiment, the mounting post diameter is uniform from the base to the free end of the post. In another embodiment, the mounting post has a larger diameter shoulder that functions as a stop flange to interface with some mounted instruments or accessory devices or the mounting hardware thereof. In one embodiment, annular plastic molded spacers or soft material spacers are incorporated into the mounting process of an instrument or accessory device to ensure linear compression may be introduced into the mounting via tightening the end cap. In one embodiment, the conical body and mounting post are fabricated of a non-metallic resilient material. In one embodiment, the top surface of the conical body functions as a stop flange to interface with some mounted instruments or accessory devices or the mounting hardware thereof.

DETAILED DESCRIPTION OF THE INVENTION

In various embodiments described in enabling detail herein, the inventor provides a unique apparatus for securing light weight instruments, recording devices, or sound shaping accessories to a microphone stand. It is a goal of the present invention to use a lightweight stand for holding a lightweight recording device, instrument, or sound shaping accessory. It is a further goal of the present invention to be able to swap out various held music accessories without swapping out stands to accommodate the next secured music accessory. A further goal of the present invention is to reduce set up and tear down time for live music events. The present invention is described using the following examples, which may describe more than one relevant embodiment falling within the scope of the invention.

Figure 1:
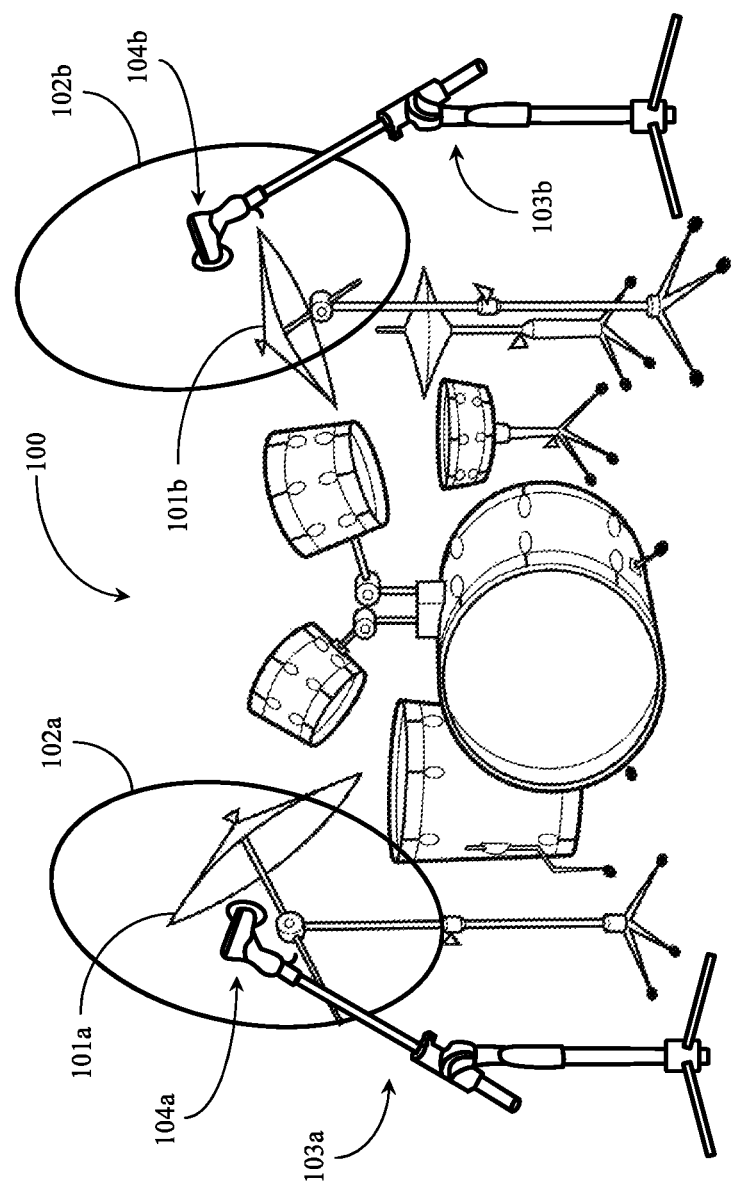
FIG. 1 is an architectural view of a drum set having sound baffle shields mounted to microphone boom stands to damper or muffle cymbal sound according to one embodiment of the present invention.

FIG. 1 is an architectural view of a drum set 100 having sound baffle shields mounted to microphone boom stands to damper or muffle cymbal sound according to one embodiment of the present invention. Drum set 100 includes two cymbals, a cymbal 101a and a cymbal 101b mounted upon cymbal stands and placed on either side of the drum kit. In this embodiment, it may be assumed that drum set 100 is part of a band that may be set up to record some music, and that other band equipment is present such as may be required to outfit a full band on set. In this embodiment, it may also be assumed that a PA system is set up and instruments are mic'd and at least one vocal microphone is used by one or more singers and is set up and operable.

In the general art it is not uncommon for a drummer to play behind a sound cage or barrier to prevent some of the more high frequency sounds like cymbal crashes from invading the singer's or singers' microphones, which may not be far away especially on a smaller stage. More recently, mountable sound baffles have become known in the art and to the inventor that can be mounted on stands using hardware and placed in a strategic position between a drummer playing set 100 and one or more microphones of a singer or singers. A sound baffle is known to the inventor a thin hard plastic molded disc of at least some transparency with a raised annular center and center hole provided there through for mounting purposes.

In this embodiment, a standing sound barrier apparatus 103a is provided to deflect sound emanating from cymbal 101a at the right side of drum kit 100 back away from a microphone used by a singer or another musician. A second standing sound barrier apparatus 103b is provided to deflect sound emanating from cymbal 101b on the left side of drum kit 100 back away from a microphone used by another singer or musician.

Standing sound barrier apparatus 103a comprises a typical microphone boom stand having three legs and a center stem supporting a boom with a standard microphone stand head 104a that is generally adapted to seat a tapered microphone in a similarly tapered microphone collar or, in one embodiment, a clamp fixture. Microphone stand head 104a may be pivoted and the boom may be rotated, extended or retracted, as well as the center stem raised or lowered to position sound baffle 102a in a correct position to properly deflect the expected sound emanating from that cymbal 101a. In this regard, the inventor provides a unique microphone stand adapter having a threaded stem and matching nut or threaded cover piece that may be used to secure a sound baffle like sound baffle 102a into microphone stand head 104a.

The architecture and application of standing sound barrier apparatus 103b is the same as apparatus 103a including mounting of the same baffles. Sound barrier apparatus 103a and 103b are standard unmodified microphone boom stands in this implementation. The use of microphone stands having microphone heads is preferred in part because of the lighter weight of a microphone stand in general and the simpler set up over other stand characterizations.

The referenced microphone stand adapter (not visible) has a tapered body with dimensions emulating that of a standard microphone that fits snugly into the collar of microphone head 104a and another plug adapter for microphone head 104b of standing sound barrier apparatus 103b. A boom stand is not necessarily required to practice the invention; however, a boom enables more flexibility in positioning the sound baffles or other instruments, recorders, or sound shaping accessories that might be mounted by the microphone stand adapter in other use embodiments unrelated to deflecting sound.

Figure 2A:
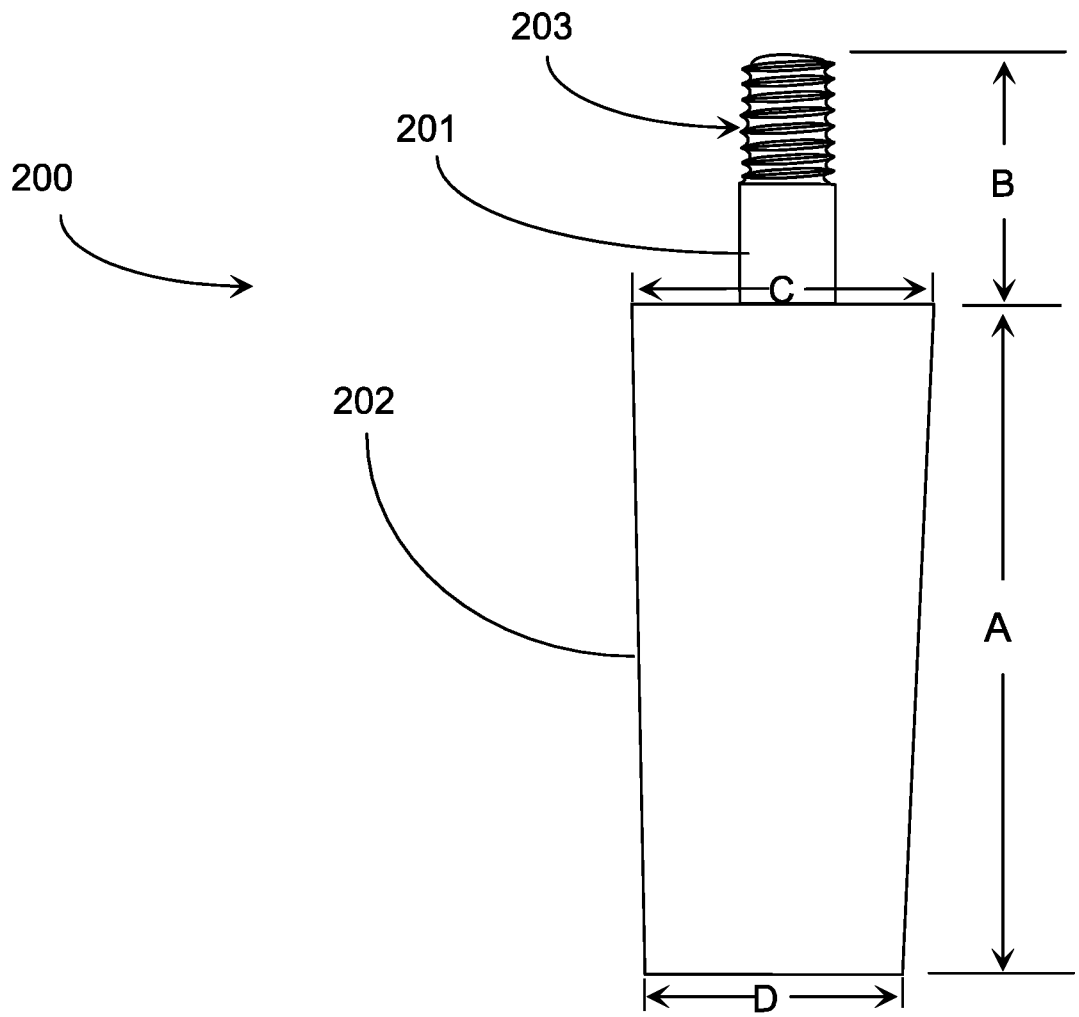
FIG. 2A is an elevation view of an adapter plug body of the adapter plug of FIG. 1.

FIG. 2A is an elevation view of a microphone stand adapter 200 mentioned in the microphone head of FIG. 1. Microphone stand adapter 200 may be a machined metal part fabricated from a solid metal rod of a steel, brass, aluminum, or another metal. Microphone stand adapter 200 may also be fabricated from a thick wall tubing having an inside diameter just greater than the outside diameter of an externally threaded mounting post 201. Microphone stand adapter 200 may be fabricated of a non-metallic resilient material without departing from the spirit and scope of the invention. Adapter plug body 202 may be a conical piece having a taper from a large diameter at top down to a smaller diameter at bottom of the adapter plug. Mounting post 201 and plug body 202 may be centered along the same longitudinal center line.

In one embodiment where microphone stand adapter 200 is solid, mounting post 201 may be a contiguous part of the body 202. In another embodiment where adapter plug body 202 is thick wall tubing, or has a longitudinal center through-hole with an inside diameter large enough to accept insertion of mounting post 201, then mounting post 201 may extend into plug body 202 to some depth and may be seam welded or spot welded in place.

Adapter plug body 202 may have an overall length A measured from the bottom face of the plug to the base of mounting post 201 of about two inches, in one embodiment, or further elongated to provide a counter-weight for larger, heavier attachments. Mounting post 201 may have an overall length B measured from the base of the post to the top edge of the external threads of about an inch. However, the overall length of the adapter plug (A+B) may be within a two inch to about a six-inch range, typically, or longer depending on the size of the attachment. The lengths for A and B are approximated for most applications. Exact length of the plug body 202 and mounting post 201 may depend on what type of utility will be mounted onto the plug.

Adapter plug body 202 has a maximum diameter C of approximately one and one quarter inches, in this embodiment, but diameters will vary by the size of the microphone head it is attached to. Adapter plug has a minimum diameter D at the bottom end of plug body 202 of approximately one inch, in this embodiment. Seating adapter plug body 202 in a microphone stand head involves slipping the piece into a split-collar piece sized to accept a standard microphone where the plug body emulates the microphone body. In one embodiment, the receptive piece on the microphone stand head is a spring clamp collar with two less than half round shells that grip the microphone or plug body.

Figure 2B:
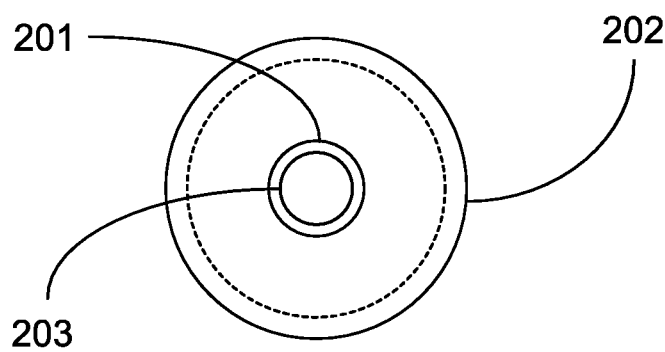
FIG. 2B is a top view of the adapter plug body of FIG. 2A.

FIG. 2B is a top view of microphone stand adapter 200 of FIG. 2A. In this view, plug body 202 is depicted as an annular plug that tapers down conically from the top shoulder to the bottom end of the plug (broken boundary). Mounting post 201 may be about three-eighths of an inch in diameter. Mounting post 201 may be externally threaded with a standard course metric threading (M 1.25) 203 having a major diameter of about 8 mm or approximately three eights of an inch. The minor diameter between threads may be about 7 mm.

In one embodiment, threading 203 may cover about one half of the length of mounting post 201. In another embodiment, threading 203 may cover most of the length of post 201. In this embodiment, mounting post 201 does not have a raised shoulder; however, in other embodiments, a shoulder may be provided on mounting post 201 above the top surface of plug body 202 as a stop flange to face against the interfacing side of the mounted utility.

In one embodiment, mounting post 201 may have M 1.25 fine threading, or may be threaded with another coarse or fine thread of a different pitch and diameter without departing from the spirit and scope of the present invention. The inventor prefers M 1.25 coarse threading because it is a standard size coarse machine thread that is common in mountable instruments and devices. Thread adapters may also be provided to mount a utility having a mounting seat tapped with a different size thread like audio/video recorders, I-phone clips, or holders that may have matching female threaded mounting seats.

Thread change adapters may be provided in some implementations to mount a device to microphone stand adapter 200 where the female threads of the device do not match external threads 203. Other elements like the sound baffles 102a and 102b of FIG. 1, standard cymbals like cymbals 101a and 101b of FIG. 1, and various other instruments having non-threaded mounting openings that are larger in diameter than thread pattern 203 and secured against the top surface of adapter plug body 202. In an embodiment including a shoulder on mounting post 201, the utilities may be secured against the shoulder.

Figure 2C:
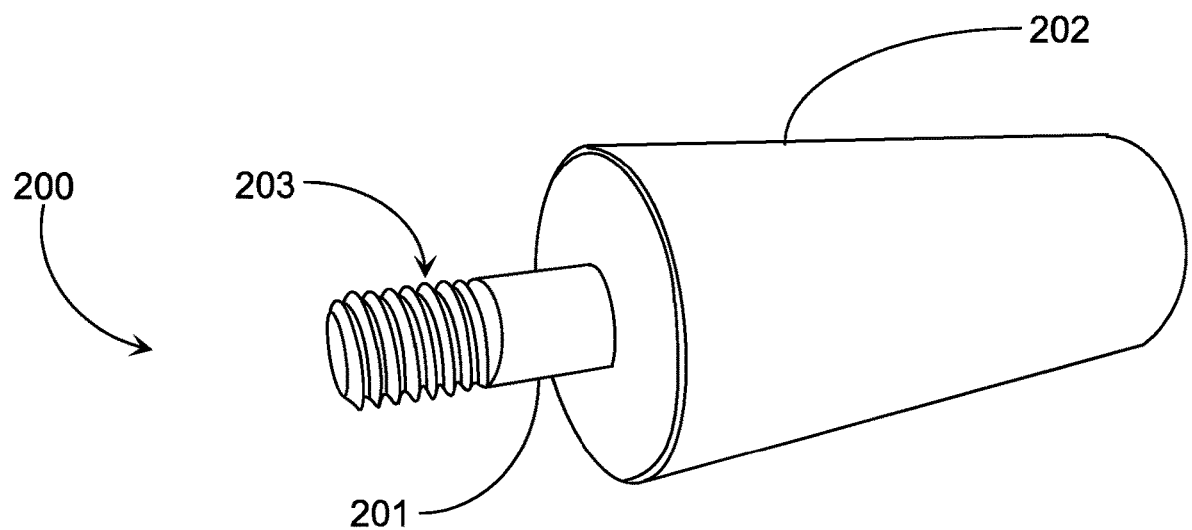
FIG. 2C is a perspective view of the adapter plug body of FIG. 2A.

FIG. 2C is a perspective view of microphone stand adapter 200 of FIG. 2A. Adapter plug body 202 is depicted in perspective. In this view, the top annular edge of adapter plug body 202 is rounded or chamfered to remove sharp edges. The minor edge of the plug body 202 may also be rounded, chamfered, sanded, ground, or filed to remove burrs. The threads 203 are clearly shown on mounting post 201.

Figure 2D:
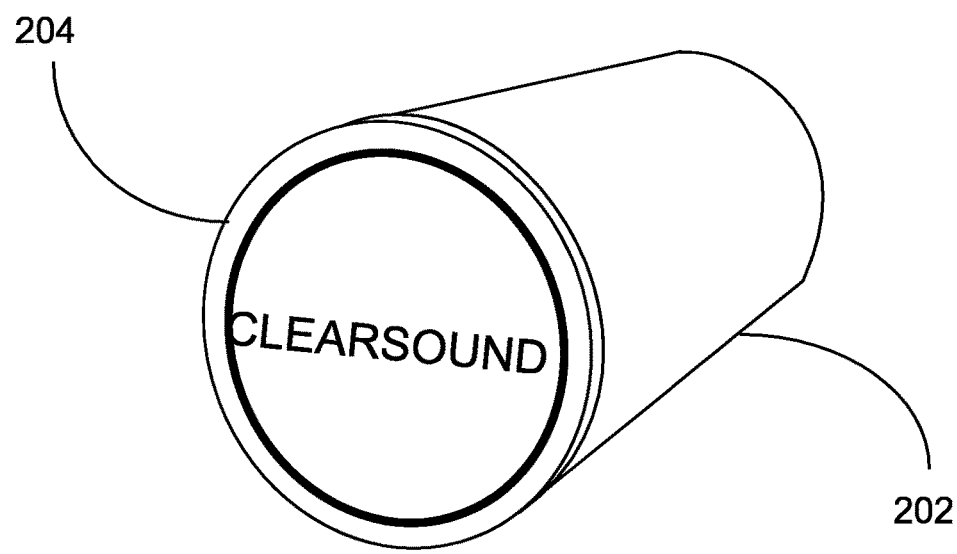
FIG. 2D is a perspective view of the adapter plug body of FIG. 2A with a threaded end cap 204.

FIG. 2D is a perspective view of the microphone stand adapter 200 of FIG. 2A with a threaded end cap 204, which attaches to one end of adapter plug body 202 via threads 203 or other means known in the art. End cap 204 may be fabricated of a hard plastic or of a metal material such as steel. End cap 204 may be closed at one end as depicted and may include a logo identifying ownership. End cap 204 also may include an M8 1.25 female threaded seat (not visible) provided at center to enable an operator to use end cap 204 to secure a mounted item.

Figure 3:
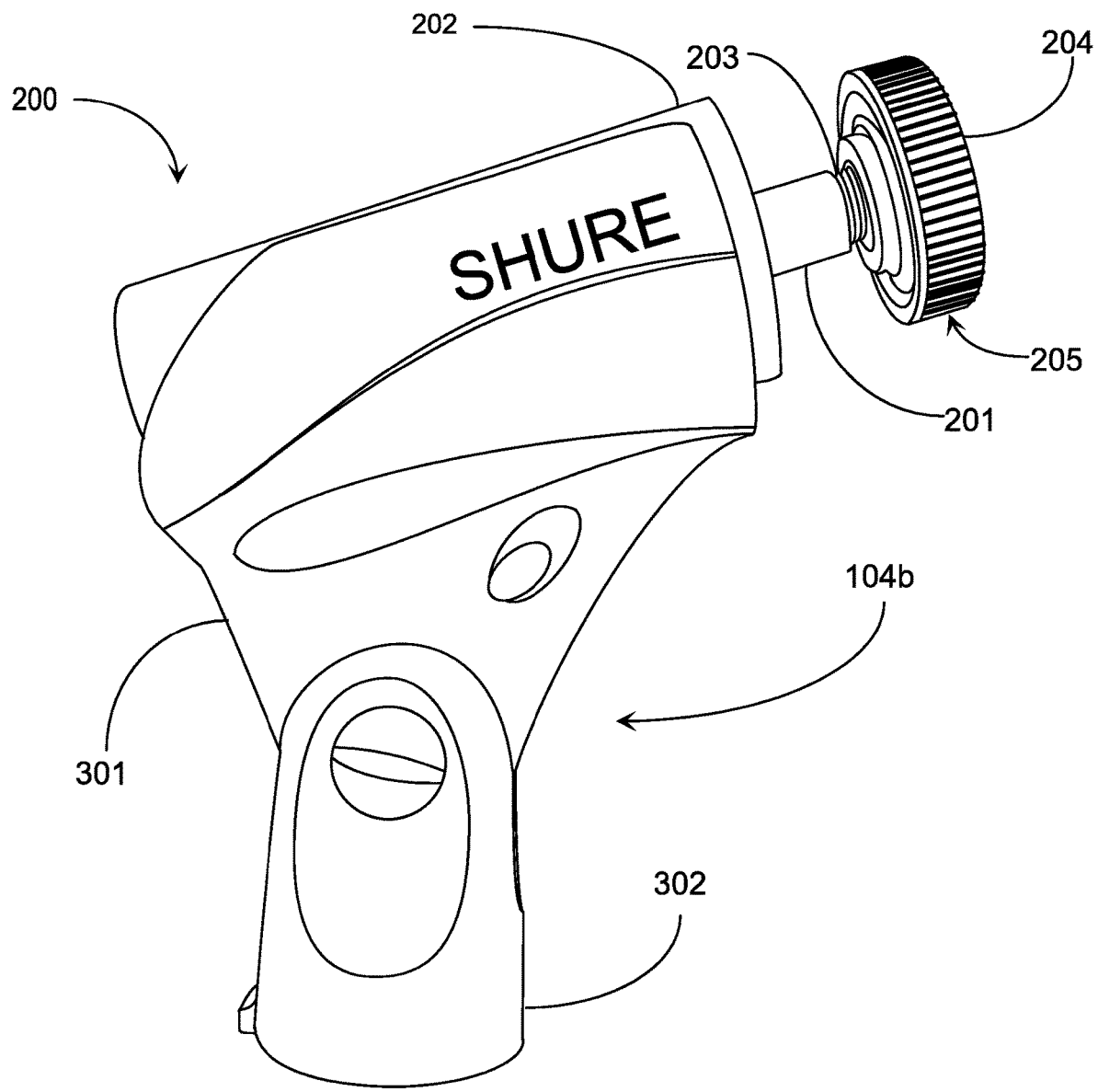
FIG. 3 is a perspective view of the adapter plug of FIG. 2C capped by a screw cap.

FIG. 3 is a perspective view of microphone stand adapter 200 and end cap 204 seated in a microphone stand head 104 (a,b) from FIG. 1. Microphone head stand 104a or 104b includes a base cap portion 302 that is threaded to screw onto the end of a boom of a microphone stand. A split collar housing 301 is mountable in pivotal fashion to the top portion of base cap 302. Split collar housing 301 holds adapter plug body 202 in the same manner as it would hold a microphone.

In this instance, microphone stand head 104a and 104b are a well-known music brand SHURE which also manufactures the microphones termed Shure microphones in the art. That should not be construed as a limitation as other microphone stand brands may also accept plug body 202 through standard measures common in the equipment dimensions. Plug body 202 may be placed narrow end first into the collar portion and urged back until friction stops the plug and a sure grip on the plug is afforded through the spring action of the split collar.

Threaded end cap 204 is depicted threaded onto threads 203 of mounting post 201. End cap 204 may have a gnarled or ribbed surface 205 to facilitate grip when a user threads the cap on or off the mounting post to mount an instrument, device, or, in the case of FIG. 1, a sound baffle like baffles 102a and 102b of FIG. 1.

In the case of mounting a thin instrument or accessory like a cymbal or a sound baffle, which is a light weight device sharing a profile with the heavier cymbal, plastic molded spacers, thick material spacers, or doughnuts may be provided below and above the utility to suspend the utility on mounting post 201 in the way a cymbal might be mounted. In the case of mounting an instrument, device, or accessory that has a tapped seat matching the M8 1.25 external threading 203, end cap 204 may be removed and set aside, and the utility may be threaded directly onto mounting post 201.

In one embodiment, a percussion block or cowbell has a hardware clamp designed to clamp onto a three-eighths of an inch post, and end cap 204 may be removed and the block or cowbell may be clamped directly onto mounting post 201 below threading 203. In another embodiment, thread adapter parts may be provided for a device or utility that has a different female thread size in the mounting seat than M8 1.25 or has an M8 1.0 fine threaded seat. A user may remove end cap 204, screw the thread adapter piece directly onto the mounting post, and may then thread the mounted item directly onto the externally threaded post presented by the thread adapter piece.

A universal microphone stand adapter 200 in the form of a common body type for docking in a split collar microphone stand head to mount an instrument, an electronic device, or a sound shaping device enables reduction in set up and tear down time when swapping out components. For example, on a set shared by several bands where the band transition time from one band to the next band playing is just 15 minutes, the microphone stand adapter 200 of the invention helps reduce overrun, which is common without it; likewise, microphone stands maybe lighter and easier to haul and set up than heavier metal tube stands or stands with multiple points of mounting.

Figure 4:
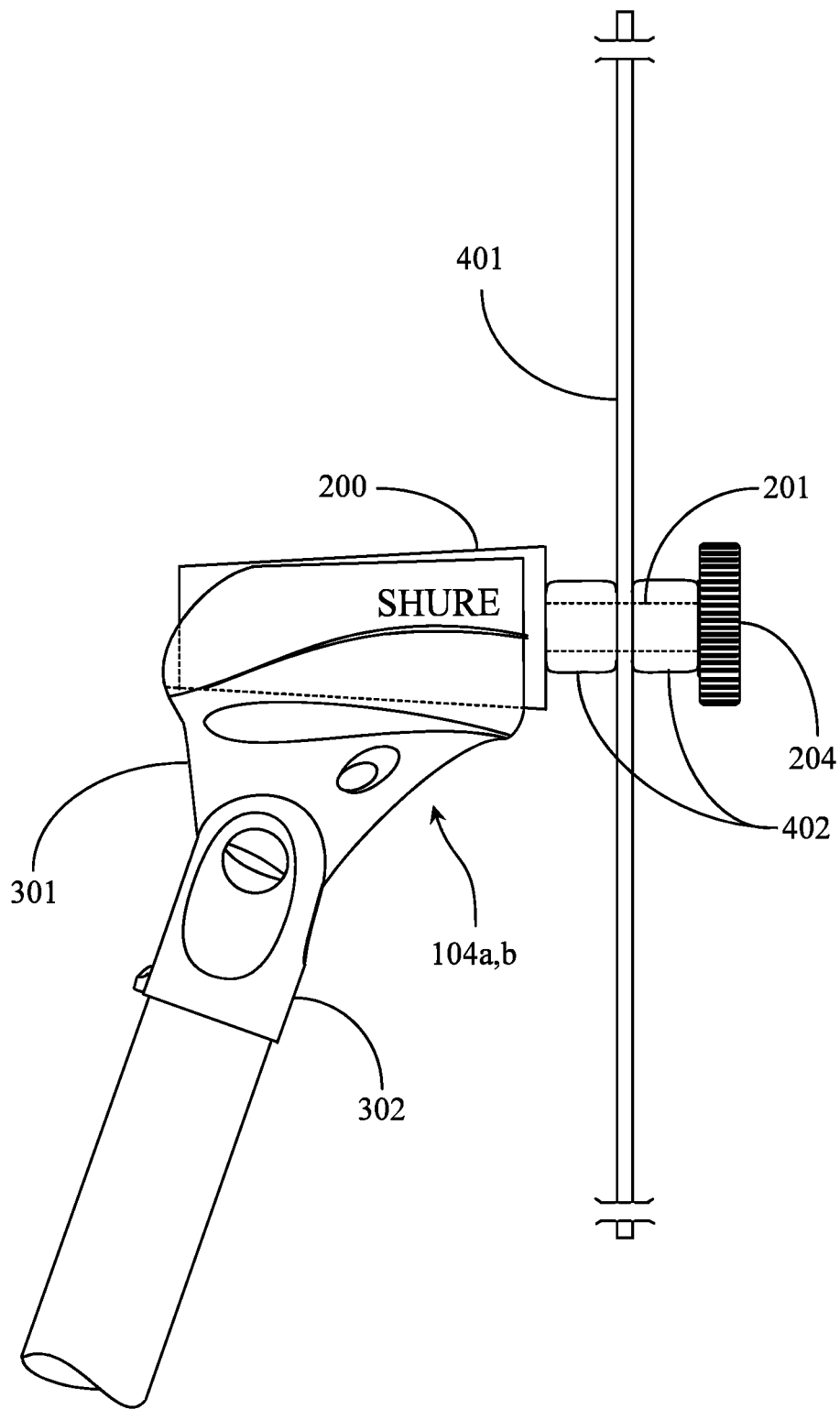
FIG. 4 is an enlarged side-elevation view of the sound baffle of FIG. 1 mounted on the adapter plug of FIG. 2C held in the microphone stand head of FIG. 3.

FIG. 4 is an enlarged side-elevation view of sound baffle 102a,b of FIG. 1 mounted on microphone stand adapter 200 of FIG. 2B held in microphone stand head 104a,b of FIG. 3. In this enlarged view, microphone stand boom 402 is cut off. Microphone stand head 104a and 104b (identical parts) are depicted holding adapter plug body 202 within a microphone slot. Microphone head 104a (104b) have a split collar housing attached to base cap portion 302 which is threaded on to the end of microphone stand boom 402. Split collar housing 301 may be pivoted up or down to change the angle that sound baffle 102a or 102b (identical parts, FIG. 1) is presented.

Threaded mounting post 201 accepts sound baffle 102a (102b) via an opening through the sound baffle at a center point of the circular baffle. In this embodiment, a plastic spacer part 401 is placed over threaded stem 201. Sound baffle 102a (102b) is then placed over stem 201 with the raised center facing away. The right face of spacer 401 abuts against the inner surface wall of sound baffle 102a (102b). A user then threads end cap 204 over threaded stem 201 and tightens end cap 204 as required to firm up the mounting. Spacers like spacer 401 may be provided in different lengths and may be fabricated of soft or hard plastic or of a matted material like spacer felt used in cymbal mounting applications.

It will be apparent to people with skill in the art that the microphone stand adapter for microphone stand heads of the present invention may be provided using some or all the elements described herein. The arrangement of elements and functionality thereof relative to the microphone stand adapter of the invention is described in different embodiments each of which is an implementation of the present invention. While the uses and methods are described in enabling detail herein, it is to be noted that many alterations could be made in the details of the construction and the arrangement of the elements without departing from the spirit and scope of this invention. The present invention is limited only by the breadth of the claims below.

The invention claimed is:

1. An adapter for mounting an instrument or accessory device to microphone stand, comprising:
   a conical body having an overall length, a maximum outside diameter, and a minimum outside diameter;
   an elongate mounting post having an overall length the mounting post contiguously formed to or otherwise fixed to the conical body, the mounting post and conical body aligned to share the same longitudinal center, the mounting post bearing external threading from the free end of the mounting post down the post to some length; and
   an end cap having a uniform outside diameter, and an annular threaded mounting seat provided at proximal center of the threaded end cap where the mounting seat threads mate with the external threads on the mounting post.

2. The adapter of claim 1, wherein the conical body is a solid body.

3. The adapter of claim 1, wherein the conical body is a thick wall hollow body.

4. The adapter of claim 1, wherein the mounting post is fixed to the conical body via weld.

5. The adapter of claim 1, wherein the conical body is a heavy metallic body.

6. The adapter of claim 1, wherein the conical body is tapered downward from the plane of the maximum outside diameter to the plane of the minimum outside diameter.

7. The adapter of claim 1, wherein the perimeter surface of the end cap is gnarled or otherwise tooled to present a positive grip surface to aid in turning the end cap.

8. The adapter of claim 1, wherein the mounting post seats into a center hole placed through the conical body at longitudinal center.

9. The adapter of claim 1, wherein the threading on the mounting post and in the mounting post seat on the end cap is M 1.25 coarse thread.

10. The adapter of claim 1, wherein the microphone stand is a boom stand and the microphone stand head is threaded to the end of the boom.

11. The adapter of claim 1, wherein the mounted instrument or accessory device is a sound baffle.

12. The adapter of claim 1, wherein the mounted instrument or accessory device is a recording device.

13. The adapter of claim 12, wherein the recording device is threaded onto a post of a thread adapter that in turn is threaded onto the mounting post.

14. The adapter of claim 1, wherein the mounted instrument or accessory device is threaded onto the mounting post.

15. The adapter of claim 1, wherein the mounting post diameter is uniform from the base to the free end of the post.

16. The adapter of claim 15, wherein annular plastic molded spacers or soft material spacers are incorporated into the mounting process of an instrument or accessory device to ensure linear compression may be introduced into the mounting via tightening the end cap.

17. The adapter of claim 15, wherein the top surface of the conical body functions as a stop flange to interface with some mounted instruments or accessory devices or the mounting hardware thereof.

18. The adapter of claim 1, wherein the mounting post has a larger diameter shoulder that functions as a stop flange to interface with some mounted instruments or accessory devices or the mounting hardware thereof.

19. The adapter of claim 1, wherein the conical body and mounting post are fabricated of a non-metallic resilient material.

* * * * *